US005660083A

United States Patent [19]
Huang et al.

[11] Patent Number: 5,660,083
[45] Date of Patent: Aug. 26, 1997

[54] GEAR SHIFTING DEVICE FOR A MULTI-SPEED BICYCLE

[75] Inventors: Jack Huang, Tainan; Yuh-Ming Hwang, Kaohsyung; Chan-Hua Feng, Hsin-Chu, all of Taiwan

[73] Assignee: Industrial Technology Reasearch Institute, Hsing-Chu, Taiwan

[21] Appl. No.: 555,874

[22] Filed: Nov. 13, 1995

[51] Int. Cl.$^6$ .................................. B62M 25/04
[52] U.S. Cl. .......................... 74/502.2; 74/475; 74/489
[58] Field of Search ................. 74/475, 489, 502.2

[56] References Cited

U.S. PATENT DOCUMENTS

| 5,241,877 | 9/1993 | Chen | 74/489 |
| 5,481,934 | 1/1996 | Tagawa | 74/475 |

FOREIGN PATENT DOCUMENTS

| 2575434 | 7/1986 | France | 74/489 |
| 3-42394 | 2/1991 | Japan | 74/502.2 |

Primary Examiner—Charles A. Marmor
Assistant Examiner—Troy Grabow
Attorney, Agent, or Firm—Bacon & Thomas

[57] ABSTRACT

A gear shifting device for a multi-speed bicycle includes a sleeve member having a flange to one side of which a drum housing is connected and to another side of which a rotary grip member is connected by means of a locking and returning device. A ratchet wheel is put over and around the sleeve member within the drum housing, a transmission steel cord reel is connected to one side of the ratchet wheel and is fixed to the sleeve member by a pullback spring. Two ratchet pawls are separately pivotally connected to the rotary grip member and the sleeve member, each having a pawl spring fixedly connected thereto to cause a pawl end of each ratchet pawl to normally contact the ratchet teeth of the ratchet wheel. A lever member is used for pushing the ratchet pawls is located within the drum housing and has a push lever extending through a slot formed on the drum housing and two projections for pushing the two ratchet pawls. The gear shifting mechanism is associated with a handlebar grip of the multi-speed bicycle, to enable a rider to easily rotate the rotary grip member or press the push lever of the lever member with a thumb to change the gearing of the bicycle.

9 Claims, 8 Drawing Sheets

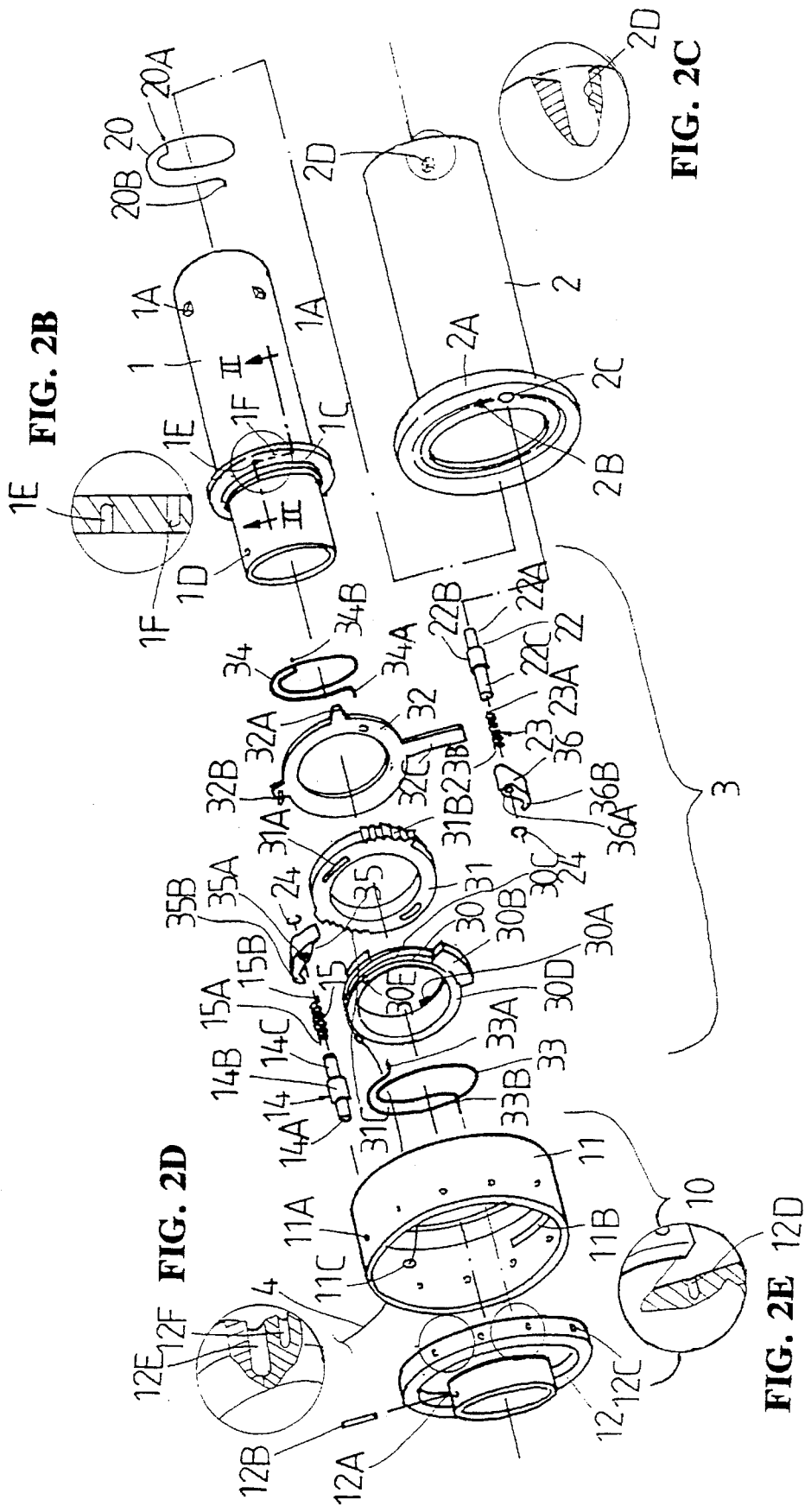

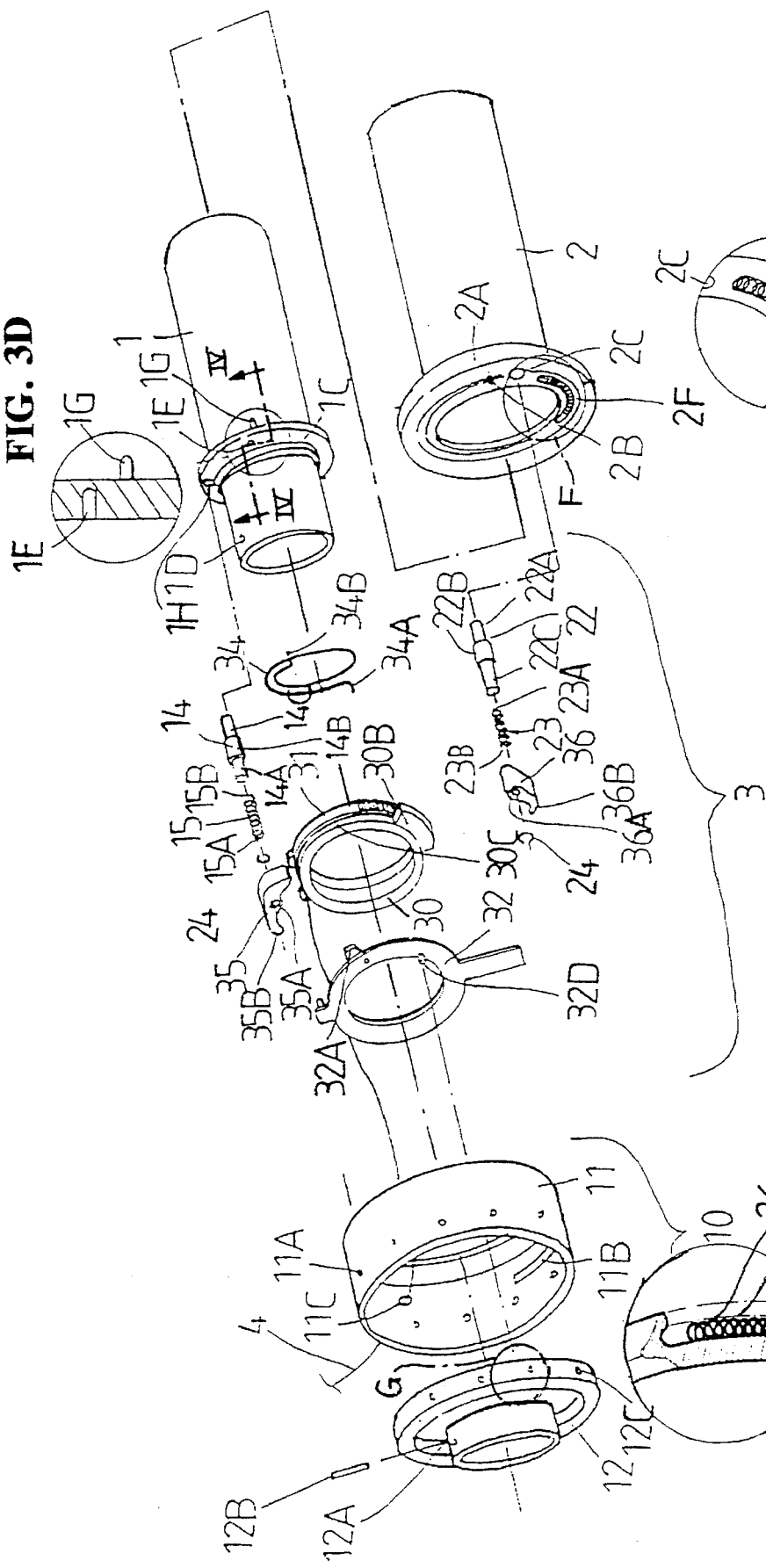

GEAR SHIFTING DEVICE FOR A MULTI-SPEED BICYCLE

BACKGROUND OF THE INVENTION

1. Field of the Invention

The present invention relates to a gear shifting device for a multi-speed bicycle, and more particularly to a gear shifting device for a multi-speed bicycle associated with a handlebar grip of the bicycle, in which a ratchet wheel and ratchet pawls are used to control a transmission steel cord reel to wind a transmission steel cord to change the gear of the bicycle.

2. Description of the Prior Art

As known by everyone who has the experience in riding a multi-speed bicycle, a known gear shifting device for the multi-speed bicycle includes a single lever as shown in FIG. 1A. A rider changes the gear of the bicycle by pushing the lever up or down. The following disadvantages are found in operating such a gear shifting device:

1. The rider tends to carelessly push the lever in the wrong direction and causes incorrect shifting. The effectiveness of the device is therefore largely reduced.

2. When the bicycle is to be geared up or down by downward movement of the lever, an index finger must be used to do so. This requires the rider to hold the handlebar grips and to push down the lever at the same time, seriously endangering the safety of the rider.

To improve the above-mentioned disadvantages, there are many different types of dual-lever gear shifting devices being developed. FIG. 1B-1 illustrates a bicycle gear shifting device having two levers which can be pushed in different directions to separately gear the bicycle to a higher speed or to a lower speed. With the device, the problem of confused shifting existing with the one-lever device can be overcome, however, the device itself still needs the index finger to operate it. FIG. 1B-2 illustrates another dual-lever gear shifting device in which the two levers are pushed in the same direction to change gearing. The problem of pushing the lever with an index finger is resolved, but the levers are again frequently incorrectly pushed by the rider. Therefore the bicycle is not correctly geared for a desired speed.

FIG. 1C illustrates another gear shifting device for a bicycle disclosed in U.S. Pat. No. 5,102,372 in which a steel cord controlling the gear shifting is loosened or tensioned through a rotational movement. This device resolves the above problems of confusing pushing directions and pushing by an index finger. However, additional springs are required to press against keyways for gear shifting, and to serve as a locating system to hold and prevent the steel cord from rotating freely. Thus, a larger force must be exerted to overcome the additional spring resistance to change the gear. That is, the gear shifting becomes effort consuming.

SUMMARY OF THE INVENTION

It is therefore an object of the invention to provide a gear shifting device for a bicycle to solve the existing problems in respect to the gear shifting of a multi-speed bicycle.

A primary object of the present invention is to provide an improved gear shifting device for a multi-speed bicycle which is associated with a handlebar grip of the bicycle and includes a transmission steel cord reel controlled by a ratchet wheel. When the handlebar grip is rotated in one direction, the transmission steel cord reel is wound with the pushed ratchet wheel and the bicycle gearing is shifted from slow to fast. Moreover, a lever is provided on the grip at a position easily accessible by a thumb to release the ratchet wheel, thereby loosening the transmission steel cord, and causing the bicycle gearing to shift from fast to slow. Since the shifting can be directly controlled through the handlebar grip which is conveniently accessible by the rider, the rider can easily and safely operate the handlebar or the brake and shift the gear at the same time without adversely affecting the rider's safety.

Another object of the present invention is to provide an improved gear shifting device for a multi-speed bicycle which is associated with a handlebar grip of the bicycle and includes a thumb lever for shifting the bicycle gearing from fast to slow. Since the thumb can exert a force much larger than an index finger to push the shifting lever, the gear shifting can therefore be more easily and conveniently completed.

A further object of the present invention is to provide an improved gear shifting device for a multi-speed bicycle which is associated with a handlebar grip of the bicycle and is so designed that its controlling member is operated by the rider in a natural way, either shifting from fast to slow or shifting from slow to fast. That is, a rider would usually turn the grip toward himself when he wants to accelerate the bicycle and would loosen his thumbs from the grips when he reduces the speed. So, when the rider wants to shift the bicycle from slow to fast, he will intuitively turn the grip in the designed direction, and when he wants to shift the bicycle from fast to slow, he will naturally push the lever with thumb without further judgement.

BRIEF DESCRIPTION OF THE DRAWINGS

The detailed structure, applied principles, and functions of the present invention can be best understood through the following detailed description of the preferred embodiments and the accompanying drawings, wherein

FIG. 1B-2 is a perspective view showing another conventional two-lever gear shifting device for a multi-speed bicycle.

FIG. 2A is an exploded perspective view of a first embodiment of the gear shifting device for a multi-speed bicycle according to the present invention.

FIG. 2B is a cross-sectional view taken along line II—II in FIG. 2A.

FIG. 2C is a partial, enlarged view, partially broken away, of area C in FIG. 2A.

FIG. 2D is a partial, enlarged view, partially broken away, of area D in FIG. 2A.

FIG. 2E is a partial, enlarged view, partially broken away, of area E in FIG. 2A.

FIG. 3C is an exploded perspective view of another embodiment of the present invention.

FIG. 3D is a cross-sectional view taken along line IV—IV in FIG. 3C.

FIG. 3E is a partial, enlarged view of area F in FIG. 3C.

FIG. 3F is a partial, enlarged view, partially broken away, of area G in FIG. 3C.

DETAILED DESCRIPTION OF THE PREFERRED EMBODIMENTS

Figure 1A:
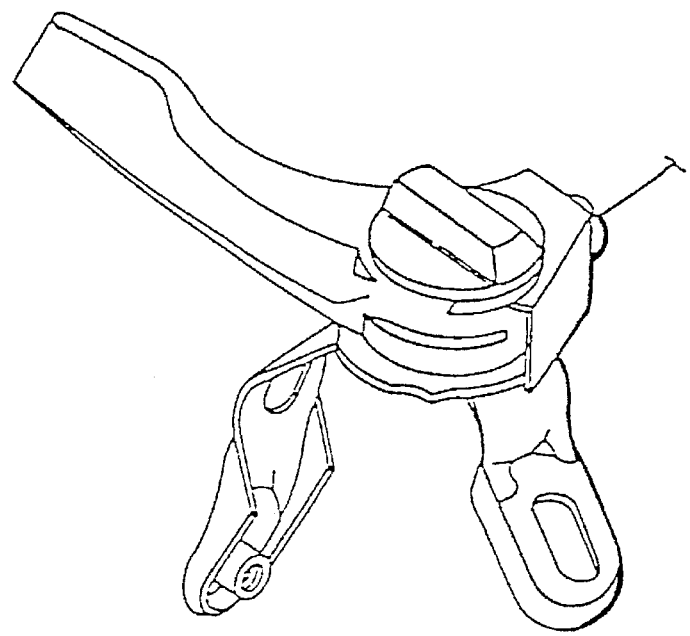
FIG. 1A is a perspective view showing a conventional single-lever gear shifting device for a multi-speed bicycle.
Figure 1C:
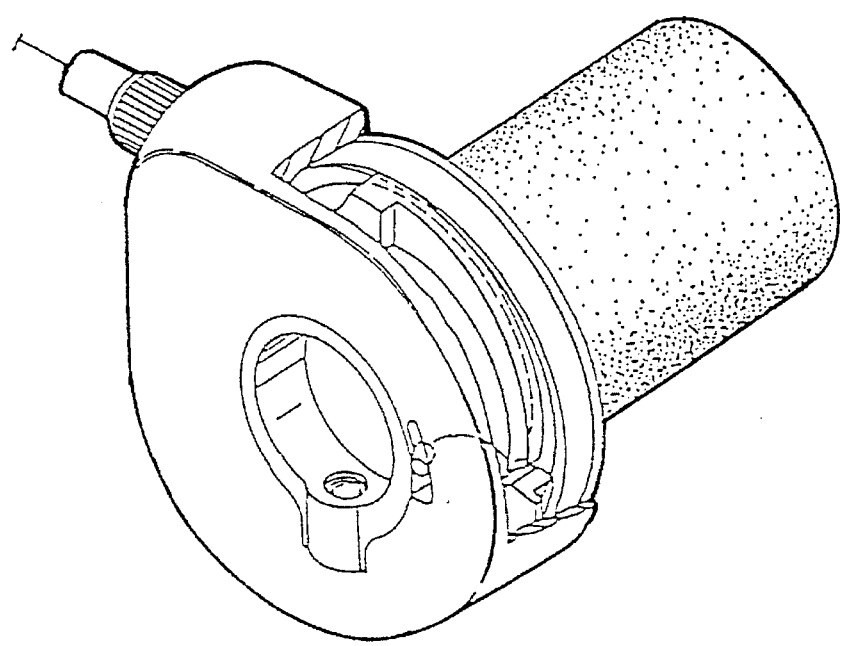
FIG. 1C is a perspective view showing a conventional rotational type gear shifting device for a multi-speed bicycle.
Figures 1, 1B:
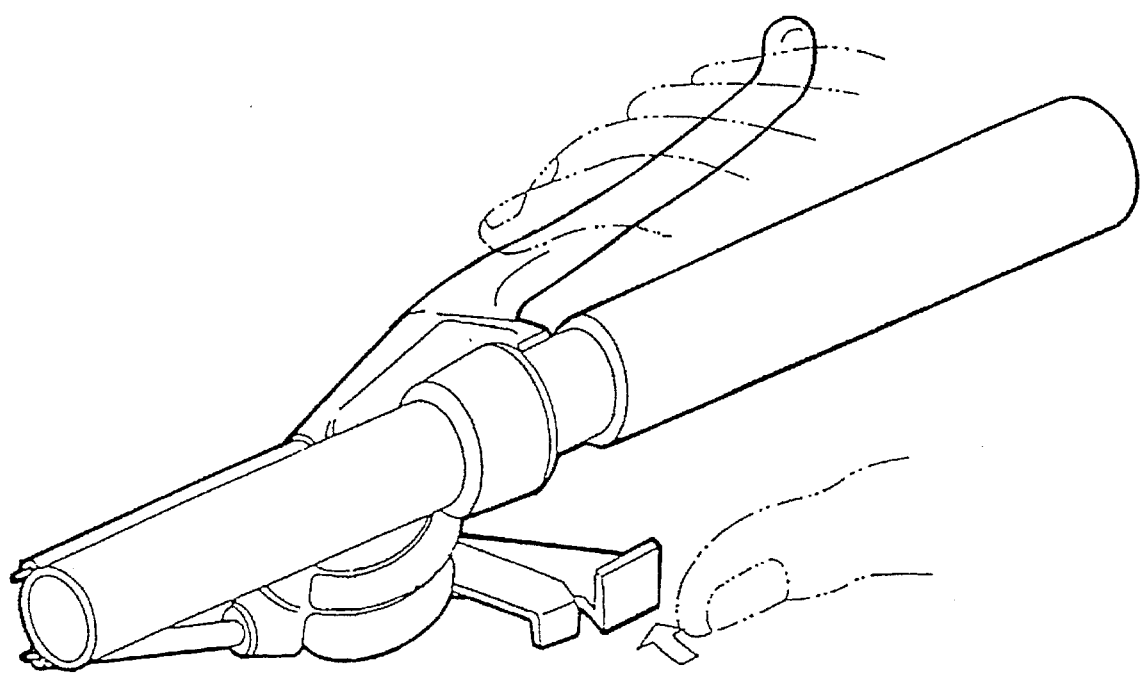
FIG. 1B-1 is a perspective view showing a conventional two-lever gear shifting device for a multi-speed bicycle.
Figures 1, 1B, 2:
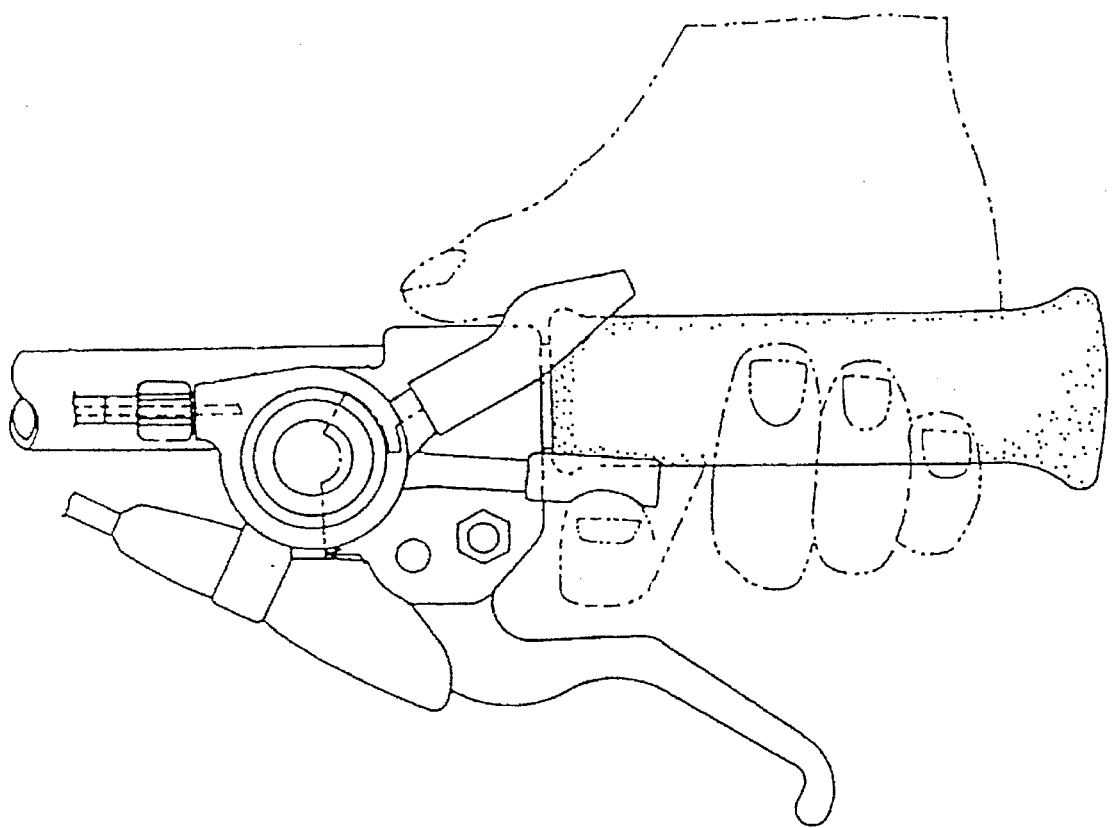

Please refer to FIG. 2A in which an exploded perspective view of a first embodiment of the present invention is shown. The present invention is a gear shifting device for a multi-speed bicycle which includes a sleeve member 1, a rotary grip member 2, and a gear shifting mechanism 3.

The sleeve member 1 is connected at one end with a drum housing 10 for accommodating the gear shifting mechanism 3. The drum housing 10 consists of a ring member 11 having circumferentially spaced connecting holes 11A and a cap member 12 having circumferentially spaced connecting holes 12C corresponding to the connecting holes 11A. The cap member 12 is attached to and covers one end of the ring member 11 by means of screws threading through the connecting holes 11A and 12C. The cap member 12 has a hub portion for receiving one end of the sleeve member 1 therein. The hub portion of the cap member 12 is formed with a fixing hole 12A, and the sleeve member 1 has a fixing hole 1D formed at a position corresponding to the fixing hole 12A, such that when the drum housing 10 is put around the sleeve member 1 with the latter put around a handlebar grip, a locking pin 12B can be used to pass through the fixing holes 12A and 1D to associate the drum housing 10 with the sleeve member 1 and to fix the two members to the handlebar grip. The locking pin 12B is usually in a form of threaded bolt.

The sleeve member 1 is connected at another end opposite to the end receiving the drum housing 10 to the rotary grip member 2 by means of a locking and returning means. The locking and returning means includes a flange 2A formed around one end of the rotary grip member 2 facing the sleeve member 1, a flange 1C formed around the sleeve member 1 near a middle part thereof to correspond to the flange 2A on the rotary grip member 2, and a first return spring 20 disposed between the flanges 1C and 2A. The flange 2A has a hole 2B formed at a surface thereof facing the sleeve member 1, and the flange 1C has a hole 1F formed at a surface thereof facing the flange 2A. The first return spring 20 has a fixing end 20B extending into and fixedly hooking up the hole 1F and a rotating end 20A extending into the hole 2B, allowing the rotary grip member 2 to be turned about the sleeve member 1 in a predetermined direction. Outer bosses 1A are formed on an outer wall of the sleeve member 1.

The gear shifting mechanism inner boss 2D is formed on an inner wall of the rotary grip member 2 to together limit the rotary grip member 2 to be rotated within a range defined by the outer bosses 1A. The gear shifting mechanism 3 accommodated in the drum housing 10 includes a transmission steel cord reel 30, a ratchet wheel 31, a first and a second ratchet pawls 36, 35, and a lever member 32.

The transmission steel cord reel 30 has circumferentially spaced and axially projecting blocks 30A formed on a side surface of the reel 30. The ratchet wheel 31 has recesses 31A formed on a side surface thereof facing the transmission steel cord reel 30 to correspond to the projecting blocks 30A. The transmission steel cord reel 30 and the ratchet wheel 31 flatly connect each other to form one united body by the engagement of the projecting blocks 30A with the recesses 31A. A steel cord connection block 30B is circumferentially extended along and radially projected from a peripheral surface of the transmission steel cord reel 30 for a transmission steel cord 4 to be fixedly connected thereto. The remaining part of the transmission steel cord 4 is wound about the transmission steel cord reel 30 along a winding groove 30C formed on the transmission steel cord reel 30. A side surface of the steel cord reel 30 facing the cap member 12 is provided with a pullback spring groove 30D and a hole 30E is further provided in the groove 30D. The cap member 12 has a hole 12D formed at a side face thereof immediately adjacent to the transmission steel cord reel 30. A first pullback spring 33 is disposed between the cap member 12 and the transmission steel cord reel 30 to associate the two elements together by positioning the first pullback spring 33 in the groove 30D with a fixing end 33B of the first pullback spring 33 extending into and firmly hooking up the hole 12D and a rotating end 33A thereof extending into the hole 30E and allowing the reel 30 to be returned to home position by the first pullback spring 33 after the transmission steel cord reel 30 has been rotated in a predetermined direction.

The lever member 32 is disposed beside the ratchet wheel 31 for pushing the ratchet pawls. A hole 1E is formed on a side surface of the flange 1C of the sleeve member 1 facing the lever member 32. A second pullback spring 34 is disposed between the lever member 32 and the flange 1C to connect the lever member 32 and the sleeve member 1 together by extending a fixing end 34B of the second pullback spring 34 into the hole 1E firmly hook up the sleeve member 1 and hooking a rotating end 34A of the second pullback spring 34 on the lever member 32, allowing the lever member 32 to be returned to a home position thereof by the second pullback spring 34 after the lever member 32 has been pushed in a predetermined direction.

The ring member 11 of the drum housing 10 has an opening 11B formed on a peripheral wall thereof for a push lever 32C of the lever member 32 to extend therefrom, allowing the rider to push the push lever 32C with a thumb. The opening 11B is preferably an elongated slot.

The second pullback spring 34, lever member 32, the ratchet wheel 31, the transmission steel cord reel 30, and the first pullback spring 33 are sequentially put over and around the sleeve member 1 at one side of the flange 1C opposite to the rotary grip member 2. The drum housing 10 is then put over and around these elements.

The second and the first ratchet pawls 35, 36 of the gear shifting mechanism 3 are connected to the cap member 12 and the flange 2A of the rotary grip member 2, respectively. The cap member 12 has a pin hole 12E formed on a side surface of the cap member 12 facing the ratchet wheel 31 for an inserting end 14A of a first pin 14 to insert thereinto. The first pin 14 has a body portion 14B around which a second pawl spring 15 is positioned. The pin 14 also has an engaging end 14C opposite to the inserting end 14A for engaging into a shaft hole 35A formed on the second ratchet pawl 35. A retaining ring 24 is disposed on the engaging end 14C of the first pin 14 to prevent the first pin 14 from disengaging from the shaft hole 35A of the second ratchet pawl 35. The second pawl spring 15 has a fixing end 15A which hooks on a hole 12F formed on the cap member 12 and a rotating end 15B which hooks on the second ratchet pawl 35 causing a pawl end 35B of the second ratchet pawl 35 to normally extend toward and into contact with one of the ratchet teeth 31C formed on the ratchet wheel 31.

The rotary grip member 2 also has a pin hole 2C formed on the flange 2A at the side surface facing the ratchet wheel 31 for an inserting end 22A of a second pin 22 to insert thereinto. The second pin 22 has a body portion 22B over and around which a first ratchet pawl spring 23 is disposed. The second pin 22 has an engaging end 22C opposite to the inserting end 22A for engaging into a shaft hole 36A of the first ratchet pawl 36. Another retaining ring 24 is disposed on the engaging end of 22C of the second pin 22 to prevent the second pin 22 from disengaging from the first ratchet pawl 36. The first ratchet pawl spring 23 has a fixing end 23A extending into and hooking on the hole 2B formed on the flange 2A of the rotary grip member 2, and a rotating end 23B hooking on the first ratchet Pawl 36, causing a pawl end 36B of the first ratchet Pawl 36 to normally extend toward and into contact with one of the ratchet teeth 31B formed on the ratchet wheel 31 generally opposite to those ratchet teeth 31C.

Figure 3B:
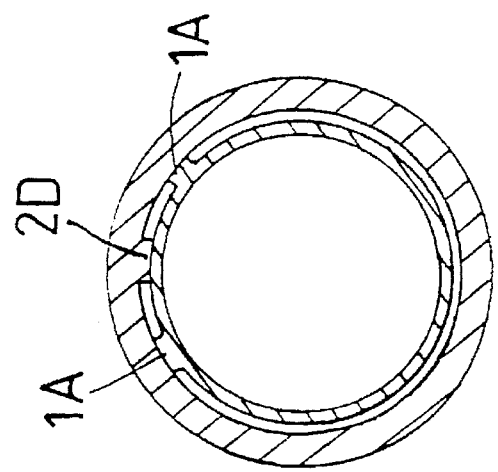
FIG. 3B is a cross-sectional view taken along line III—III of FIG. 3A.
Figure 3A:
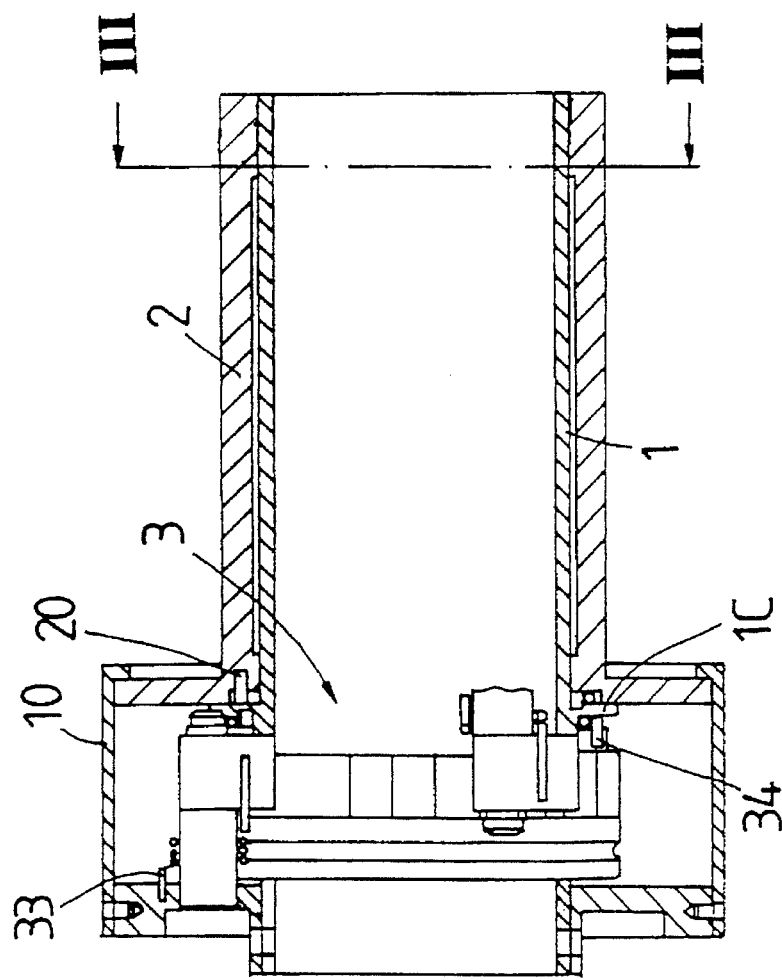
FIG. 3A is a longitudinal cross-sectional view showing an assembled gear shifting mechanism for a multi-speed bicycle as shown in FIG. 2.

FIG. 3A is a sectional view of the assembled gear shifting device of the present invention and FIG. 3B is a cross section taken on a rear portion of the assembled sleeve member 1 and the rotary grip member 2. From the figures, it can be seen that the gear shifting mechanism 3 of the present invention is accommodated inside the drum housing 10 connected to a front portion of the sleeve member 1 and is connected with the drum housing 10 and the flange 1C of the sleeve member 1 by means of the first and the second pullback springs 33, 34 respectively. The rotary grip member 2 is put over and around the sleeve member 1 and is connected thereto to be rotatable relative to the flange 1C of the sleeve member 1 by means of the first return spring 20. The inner boss 2D of the rotary grip member 2 shall abut against one of the outer bosses 1A of the sleeve member 1 when the rotary grip member 2 is turned relative to the sleeve member 1 to a certain degree and thereby limits the rotary movement of grip member 2 within a predetermined range. That is, each time the rider wants to change the gear of the bicycle, he may only gear up or down within a proper and safe range.

FIG. 3C illustrates another embodiment of the present invention in which the locking and returning means includes an arcuate recess 2F formed on the flange 2A of the rotary grip member 2 at the side surface thereof facing the flange 1C of the sleeve member 1, a coil spring 25 disposed in the arcuate recess 2F, and a retaining projection 1G formed on the flange 1C of the sleeve member 1 at the side surface facing the arcuate recess 2F. The retaining projection 1G extends into the arcuate recess 2F and abuts against one end of the coil spring 25, thereby, the rotary grip member 2 can be rotated relative to the sleeve member 1 by the rider only within a predetermined range to change the gear.

In the second embodiment, the cap member 12 also has an arcuate recess 12G formed on the side surface thereof facing the lever member 32. A coil spring 26 is disposed in the arcuate recess 12G. The lever member 32 has a stop boss 32D formed on the side surface thereof facing the cap member 12 corresponding to the arcuate recess 12G. The stop boss 32D extends into the arcuate recess 12G and abuts against one end of the coil spring 26, thereby, the lever member 32 can be returned to its home position by the spring force of the spring 26 when the lever member 32 is pushed to change the gear.

In a further embodiment, the ratchet wheel 31 and the transmission steel cord reel 30 are integrally formed with the lever member 32 being provided at one end of the transmission steel cord reel 30 to simplify the structure and the assembling of the present invention. To facilitate the assembling, the sleeve member 1 may also have a pin hole 1H formed on the flange 1C at the side surface thereof facing the ratchet wheel 31 for insertion of the first pin 14 and thereby, the pawl end of the second ratchet pawl 35 can be easily aligned with a ratchet tooth of the ratchet wheel.

Figures 4A, 4D:
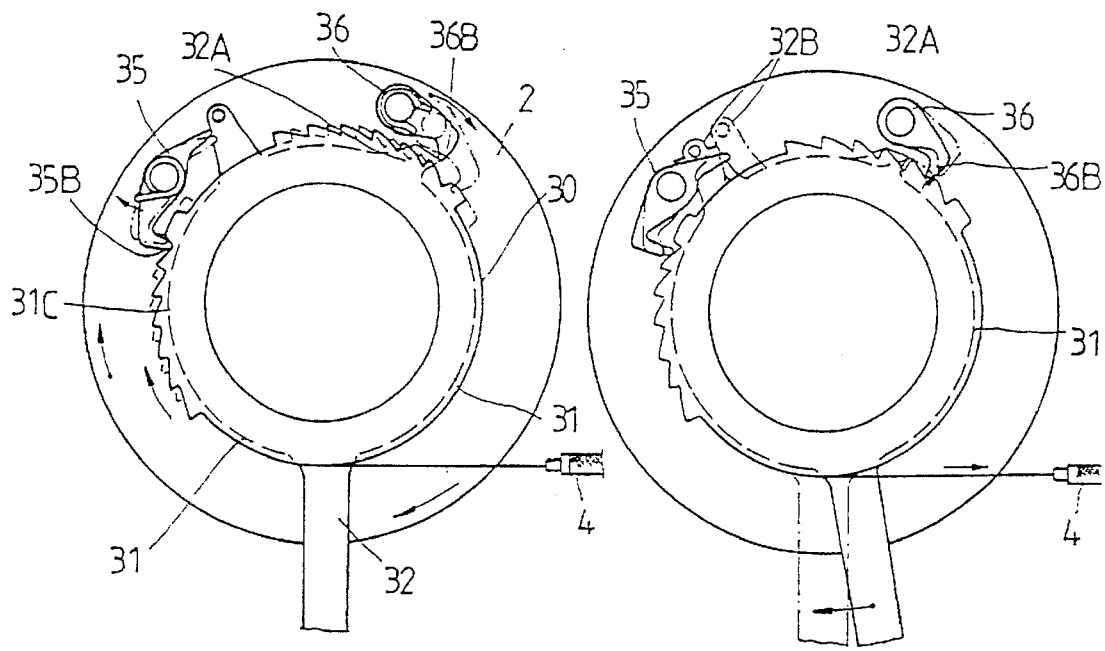
FIG. 4A is a schematic view illustrating the present invention in a position of starting to shift from slow to fast.
FIG. 4D is a schematic view illustrating the present invention in a position of having been shifted from fast to slow.

FIGS. 4A to 4D illustrate the movements of the present invention in changing the gears. FIG. 4A shows the present invention in a position in which the bicycle is to be geared up from a normal condition. The first ratchet pawl 36 is pushed away from engaging with any tooth of the ratchet wheel 31 by a projection 32A of the lever member 32 while a ratchet tooth 31C of the ratchet wheel 31 engages with the pawl end 35B of the second ratchet pawl 35, preventing the transmission steel cord reel 30 connected with the ratchet wheel 31 from rotating and thereby, the transmission steel cord 4 is kept in place. When the rotary grip member 2 is rotated in a direction as shown by the arrows in the drawing, the first ratchet pawl 36 which is pivotally fixed to the rotary grip member 2 shall be gradually moved away from contacting with the projection 32A of the lever member 32 following the rotary grip member 2. At this point, the pawl end 36B of the first ratchet pawl 36 moves toward ratchet teeth 31B. Meanwhile, the pawl end 35B of the second ratchet pawl 35 which is pivotally fixed to the cap member 12 is pushed by an inclined surface of the ratchet teeth 31C to move toward and hook into a next root of tooth, preventing the ratchet wheel 31 from rotating in a reverse direction under a returning force of the wound transmission steel cord 4. The gear of the bicycle is thereby changed during the rotation of the rotary grip member 2. The gear can be changed by moving the ratchet pawls to pass multiple teeth or only one ratchet tooth. From FIG. 4B, it can be seen that when the rotary grip member 2 is released by the rider 1 it rotates in a reverse direction as shown by the arrows in the drawing under a spring force of the return spring 20 or the coil spring 25. At this point, the first ratchet pawl 36 is returned to its home position, that is, being pushed away from contacting with the ratchet teeth 31B by the projection 32A of the lever member 32. The movement of gearing up is now completed.

Figures 4B, 4C:
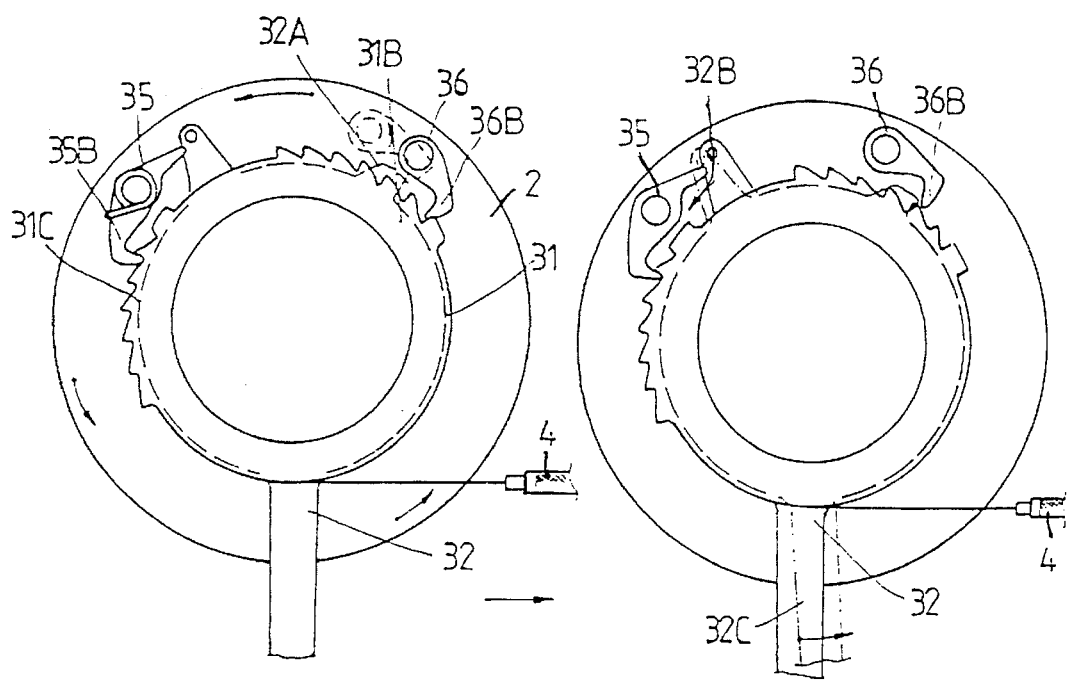
FIG. 4B is a schematic view illustrating the present invention in a position of having been shifted from slow to fast.
FIG. 4C is a schematic view illustrating the present invention in a position of starting to shift from fast to slow.

FIG. 4C illustrates the present invention in a position in which the bicycle has been geared up and is to be geared down from a normal condition. The push lever 32C of the lever member 32 is pushed by the rider with a thumb in a direction as shown by the arrows in the drawing, causing a projection 32B on the lever member 32 to be in contact with a rear end of the second ratchet pawl 35 opposite to the pawl end 35B and to force the second ratchet pawl 35 to pivotally turn upward and backward. Meanwhile, the projection 32A of the lever member 32 is moved backward to allow the first ratchet pawl 36 to gradually move into and be stopped at the root of a next ratchet tooth 31B.

When the second ratchet pawl 35 disengages from the ratchet wheel 31, the ratchet wheel 31 is pulled by the transmission steel cord 4 to rotate backward. At this instantaneous point, the ratchet wheel 31 is retained by the first ratchet pawl 36 and stops further rotating backward. From FIG. 4D, it can be seen that when the lever member 32 is pulled by the second pullback spring 34 to its home position, the projection 32B thereof gradually moves away from the second ratchet pawl 35 and hook into the ratchet tooth 31C. Meanwhile, following the returning of the lever member 32 to its home position, the Projection 32A thereof pushes the first ratchet pawl 36 upward to disengage from the ratchet teeth and the whole gear shifting mechanism 3 returns to a position as shown in FIG. 4A in which the transmission steel cord 4 has been extended and the bicycle is geared down. During gearing down, the ratchet wheel 31 can be rotated backward by only one ratchet tooth each time and will keep in place until the next gearing up or down.

Figure 5:
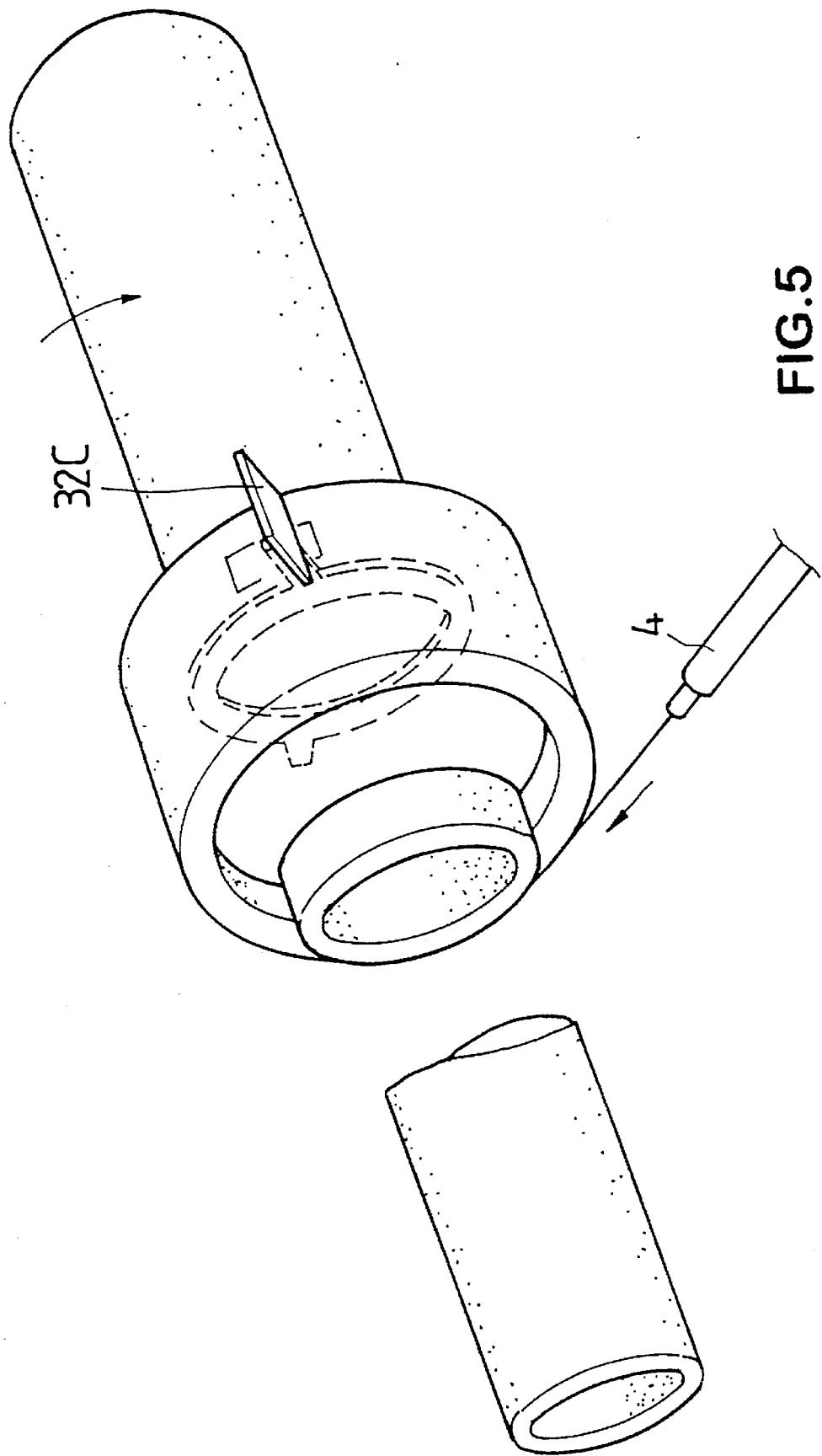
FIG. 5 is a fragmentary, enlarged, perspective view showing the manner in which the present invention is operated.

FIG. 5 illustrates the manner in which the present invention is operated. As shown, the gear shifting mechanism of the present invention is associated with the handlebar grip of the bicycle. The rider grips the rotary grip member and turns the same in a direction to wind up the transmission steel cord 4, the bicycle is geared up. When the rider pushes the push lever 32C of the lever member 32 with a thumb, the wound transmission steel cord 4 is loosened and the bicycle is geared down. With the above arrangements, the gear shifting device of the present invention can be safely and easily controlled by the rider without any possible confusion in operating directions which results in wrongly shifting of the gear.

The above description and accompanying drawings are only used to illustrate a preferred embodiment of the present invention, not intended to limit the scope thereof. Many changes and modifications of the embodiment can be made without departing from the spirit of the present invention.

We claim:

1. A gear shifting device for a multi-speed bicycle, comprising:

a sleeve member having a flange provided thereon between first and second ends thereof;

a drum housing fixedly attached to the sleeve member so as to extend over the flange and enclose the first end of the sleeve member;

a rotary grip member located on the sleeve member so as to be rotatable with respect to the sleeve member;

a locking and returning means having a first end connected to said sleeve member and a second end connected to the rotary grip member;

a first ratchet pawl and a second ratchet pawl wherein said first ratchet pawl is pivotally connected to said rotary grip member and has a first pawl spring fixedly connected thereto, and said second ratchet pawl is pivotally connected to one of said drum housing and said flange of said sleeve member, and has a second pawl spring fixedly connected thereto;

a lever member for pushing said first and said second ratchet pawls, said lever member movably located on the first end of said sleeve member, said lever member having a push lever extending through a slot formed on said drum housing, said lever member having a first projection formed opposite to said push lever for pushing against second ratchet pawl, and a second projection formed between said push lever and said first projection for pushing against said first ratchet pawl;

a first pullback spring connected to one of the drum housing and the sleeve member, and to the lever member so as to bias the lever member to a home position;

a ratchet wheel movably located on the first end of said sleeve member;

a transmission steel cord reel connected to the ratchet wheel so as to move therewith, said cord reel having a transmission steel cord attached thereto such that rotary movement of the transmission steel cord reel causes movement of the transmission steel cord; and a second pullback spring connected to the transmission steel cord reel and one of the sleeve member and the drum housing not connected to the first pullback spring.

2. The gear shifting device for a multi-speed bicycle as claimed in claim 1, wherein said locking and returning means further comprises: two outer bosses formed on an outer wall of said sleeve member and an inner boss formed on an inner wall of said rotary grip member and located between said two outer bosses of said sleeve member to limit rotary movement of said rotary grip member relative to said sleeve member within a predetermined range; a hole formed on said flange of said sleeve member and a hole formed on said rotary grip member for insertion of opposite ends of a first return spring such that said rotary grip member is returned to a home position by a returning force of said first return spring.

3. The gear shifting device for a multi-speed bicycle as claimed in claim 1, wherein said drum housing comprises a ring member and a cap member attached to the ring member and covering an end of said ring member.

4. The gear shifting device for a multi-speed bicycle as claimed in claim 3, wherein said ring member is formed with said slot formed on said drum housing.

5. The gear shifting device for a multi-speed bicycle as claimed in claim 4, wherein said slot is elongated.

6. The gear shifting device for a multi-speed bicycle as claimed in claim 1, wherein said ratchet wheel and said transmission steel cord reel are integrally formed.

7. The gear shifting device for a multi-speed bicycle as claimed in claim 1, wherein said second pawl is pivotally connected to said sleeve member, and the outer end of said first pullback spring sleeve member is fixedly connected to the flange of said sleeve member.

8. The gear shifting device for a multi-speed bicycle of claim 1 wherein said second ratchet pawl is pivotally connected to said sleeve member.

9. The gear shifting device for a multi-speed bicycle as claimed in claim 8, wherein said locking and returning means comprises: an arcuate recess formed on said rotary grip member; a coil spring disposed in said arcuate recess; and a retaining projection formed on said sleeve member extending into said arcuate recess and abutting against one end of said coil spring, whereby said rotary grip member is returned to a home position by a returning force of said coil spring.

* * * * *